United States Patent
Ichiki et al.

(10) Patent No.: US 12,212,262 B2
(45) Date of Patent: Jan. 28, 2025

(54) POWER CONVERTING APPARATUS, MOTOR DRIVING APPARATUS, BLOWER, COMPRESSOR, AND AIR CONDITIONER

(71) Applicant: Mitsubishi Electric Corporation, Tokyo (JP)

(72) Inventors: Satoru Ichiki, Tokyo (JP); Kazunori Hatakeyama, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 18/005,896

(22) PCT Filed: Sep. 4, 2020

(86) PCT No.: PCT/JP2020/033639
§ 371 (c)(1),
(2) Date: Jan. 18, 2023

(87) PCT Pub. No.: WO2022/049734
PCT Pub. Date: Mar. 10, 2022

(65) Prior Publication Data
US 2023/0283219 A1    Sep. 7, 2023

(51) Int. Cl.
*H02P 27/08* (2006.01)
*H02K 7/14* (2006.01)
*H02K 11/33* (2016.01)

(52) U.S. Cl.
CPC .......... *H02P 27/085* (2013.01); *H02K 7/14* (2013.01); *H02K 11/33* (2016.01)

(58) Field of Classification Search
CPC ......... H02K 11/33; H02K 7/14; H02M 3/155; H02M 7/12; H02P 27/08; H02P 27/085; H02P 6/14; Y02B 70/10
(Continued)

(56) References Cited

U.S. PATENT DOCUMENTS 5,430,639 A * 7/1995 Takahashi ........... H02M 1/4216
                                                363/124
7,580,272 B2 * 8/2009 Taguchi ............. H02M 1/4225
                                                323/222
(Continued)

FOREIGN PATENT DOCUMENTS

JP    H10-042564 A    2/1998
JP    2007-195282 A    8/2007
(Continued)

OTHER PUBLICATIONS

International Search Report of the International Searching Authority mailed Nov. 10, 2020 for the corresponding International Application No. PCT/JP2020/033639 (and English translation).

*Primary Examiner* — Alex W Mok
(74) *Attorney, Agent, or Firm* — Posz Law Group, PLC

(57) ABSTRACT

A power converting apparatus includes a converter circuit converting an alternating-current voltage output from an alternating-current power supply into a direct-current voltage. The converter circuit includes unit converters. The power converting apparatus generates a reference duty on the basis of detection values of a current detector and a voltage detector and generates, on the basis of a result of comparison between the reference duty and a carrier signal, a pulse-width modulation signal for controlling the switching element. In each of the unit converters, the pulse-width modulation signal has one pulse within a carrier period and has pulses for the number of phases within a leveling period, the leveling period being obtained by multiplying the carrier period by the number of phases. The pulses for the number of phases within the leveling period have phases all different from each other in the respective carrier periods.

10 Claims, 10 Drawing Sheets

(58) Field of Classification Search
USPC .......................................................... 310/66
See application file for complete search history.

(56) References Cited

U.S. PATENT DOCUMENTS

| | | | |
|---|---|---|---|
| 9,847,735 B2* | 12/2017 | Shimomugi | H02M 1/4208 |
| 9,929,670 B2* | 3/2018 | Yamada | H02M 1/12 |
| 10,044,280 B2* | 8/2018 | Kondo | H02M 3/1588 |
| 10,056,826 B2* | 8/2018 | Hatakeyama | H02M 1/4225 |
| 10,263,539 B2* | 4/2019 | Yuasa | H02M 7/06 |
| 10,389,245 B2* | 8/2019 | Uenaka | H02J 7/0068 |
| 10,693,377 B2 | 6/2020 | Kutsuki et al. | |
| 2006/0145674 A1* | 7/2006 | Shelton | H02M 1/4225 |
| | | | 323/282 |
| 2011/0132899 A1* | 6/2011 | Shimomugi | H02M 7/06 |
| | | | 363/126 |

FOREIGN PATENT DOCUMENTS

| | | | | |
|---|---|---|---|---|
| JP | 2009254164 A | * | 10/2009 | |
| JP | 2017-208976 A | | 11/2017 | |
| JP | 2019134575 A | * | 8/2019 | |
| WO | 2017/145303 A1 | | 8/2017 | |
| WO | WO-2018025355 A1 | * | 2/2018 | ............ H02M 3/155 |
| WO | WO-2018229851 A1 | * | 12/2018 | ............ H02M 3/155 |

\* cited by examiner

POWER CONVERTING APPARATUS, MOTOR DRIVING APPARATUS, BLOWER, COMPRESSOR, AND AIR CONDITIONER

CROSS-REFERENCE TO RELATED APPLICATION

This application is a U.S. National Stage Application of International Application No. PCT/JP2020/033639 filed on Sep. 4, 2020, the contents of which are incorporated herein by reference.

TECHNICAL FIELD

The present disclosure relates to a power converting apparatus that converts an alternating-current voltage output from an alternating-current power supply into a direct-current voltage, a motor driving apparatus including the power converting apparatus, a blower and a compressor including the motor driving apparatus, and an air conditioner including the blower or the compressor.

BACKGROUND

Patent Literature 1 below describes that in an interleaved converter that generates a desired output voltage by driving n-phase switching output stages with a phase difference of 360°/n, balancing control of reactor currents flowing through reactors of respective phases is performed on the basis of a current feedback signal based on a detection current of each of the reactors and a voltage feedback signal.

PATENT LITERATURE

Patent Literature 1: Japanese Patent Application Laid-open No. 2017-208976

A reactor current of each phase is leveled by the current balancing control described in Patent Literature 1. However, in the technique of Patent Literature 1, it is required to individually detect the reactor current in each phase, and thus a current detector is required for each phase. Therefore, the technique of Patent Literature 1 has a problem in that manufacturing cost increases.

SUMMARY

The present disclosure has been made in view of the above, and an object thereof is to obtain a power converting apparatus capable of leveling a reactor current while preventing an increase in manufacturing cost.

In order to solve the above problem and achieve the object, a power converting apparatus according to the present disclosure includes a converter circuit converting an alternating-current voltage output from an alternating-current power supply into a direct-current voltage. The converter circuit includes unit converters for the number of phases, each of the unit converters including one reactor and at least one switching element, the number of phases being more than one. In addition, the power converting apparatus includes a current detector detecting the sum of currents flowing through the respective reactors, and a voltage detector detecting an output voltage of the converter circuit. Furthermore, the power converting apparatus includes a control device generating a reference duty on the basis of detection values of the current detector and the voltage detector and generating, on the basis of a result of comparison between the reference duty and a carrier signal, a pulse-width modulation signal for controlling the switching element. A first period is shorter than a second period, the first period being a period of the carrier signal and the second period being a period of the alternating-current voltage. The pulse-width modulation signal in each of the unit converters has one pulse within the first period and has pulses for the number of phases within a third period, the third period being obtained by multiplying the first period by the number of phases. In addition, the pulses for the number of phases within the third period in each of the unit converters have phases all different from each other in the respective first periods.

The power converting apparatus according to the present disclosure achieves an effect that it is possible to level a reactor current while preventing an increase in manufacturing cost.

DETAILED DESCRIPTION

Hereinafter, the power converting apparatus, the motor driving apparatus, the blower, the compressor, and the air conditioner according to each embodiment of the present disclosure will be described with reference to the accompanying drawings.

First Embodiment

Figure 1:
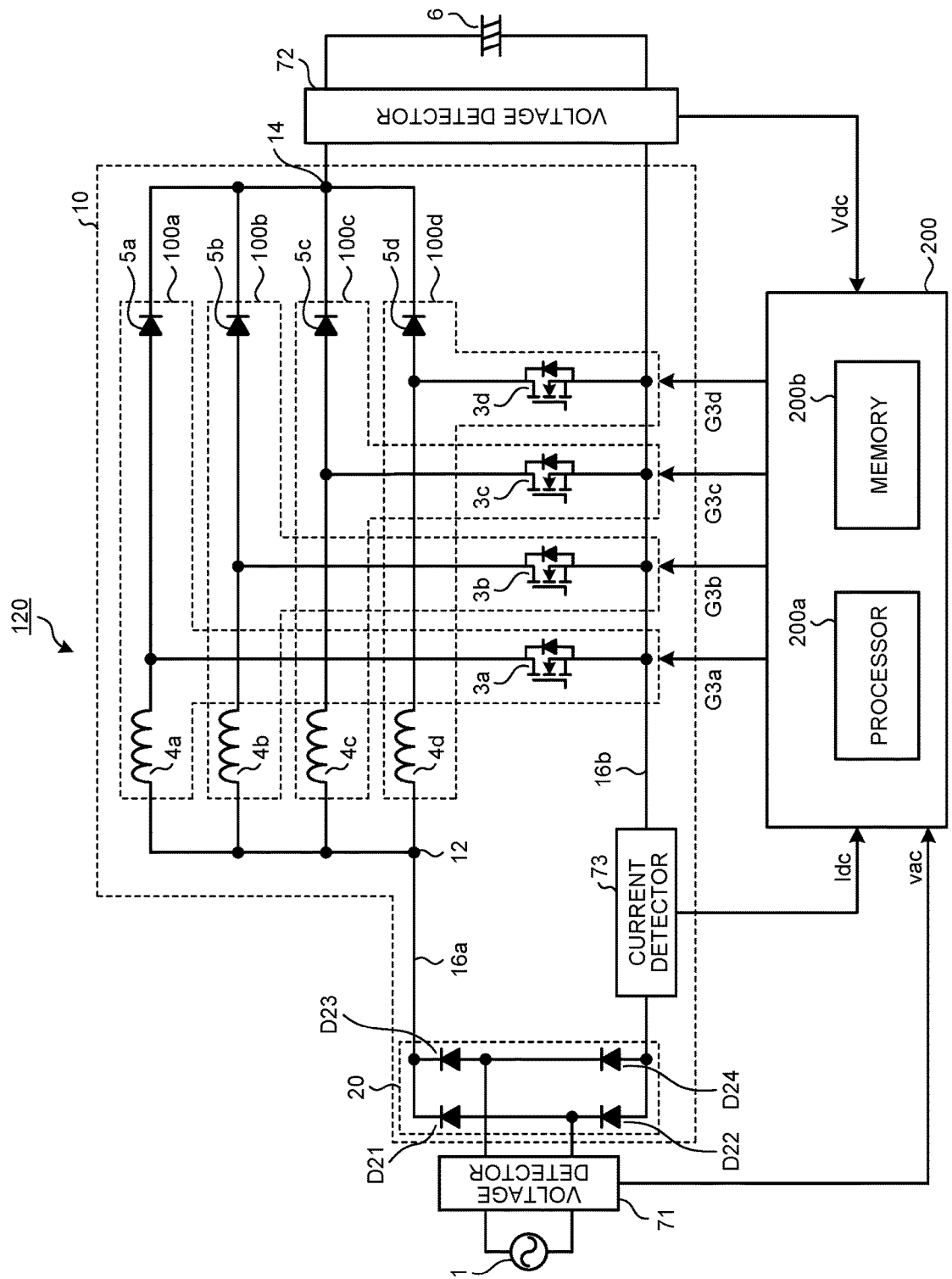
FIG. 1 is a diagram illustrating a configuration of a power converting apparatus according to a first embodiment.

FIG. 1 is a diagram illustrating a configuration of a power converting apparatus 120 according to a first embodiment. The power converting apparatus 120 according to the first embodiment includes a converter circuit 10, a smoothing capacitor 6, voltage detectors 71 and 72, a current detector 73, and a control device 200.

The converter circuit 10 converts an alternating-current voltage output from an alternating-current power supply 1 into a direct-current voltage. The smoothing capacitor 6 smooths and holds the direct-current voltage converted by the converter circuit 10.

The converter circuit 10 includes unit converters 100a, 100b, 100c, and 100d, and a rectifier circuit 20.

The rectifier circuit 20 includes four diodes D21, D22, D23, and D24 that are bridge-connected. The rectifier circuit 20 rectifies the alternating-current voltage output from the alternating-current power supply 1, and applies the rectified voltage to the unit converters 100a, 100b, 100c, and 100d.

The unit converter 100a includes a reactor 4a, a backflow-preventing diode 5a, and a switching element 3a. The unit converter 100b includes a reactor 4b, a backflow-preventing diode 5b, and a switching element 3b. The unit converter 100c includes a reactor 4c, a backflow-preventing diode 5c, and a switching element 3c. The unit converter 100d includes a reactor 4d, a backflow-preventing diode 5d, and a switching element 3d.

In the converter circuit 10, a combination of one reactor and one switching element is defined as a "phase" and is counted as "one phase".

FIG. 1 illustrates an example of four phases, and illustrates a four-phase interleaved configuration. The respective phases are identified by subscripts a, b, c, and d. Hereinafter, operations of respective phases may be referred to as "a phase", "b phase", "c phase", and "d phase". The content of the present disclosure is not limited to only four phases, and two phases, three phases, or five or more phases may be employed. That is, the power converting apparatus 120 according to the present disclosure is an interleaved power converting apparatus including unit converters for the number of phases being more than one.

The converter circuit 10 includes a connection point 12 at which ends on one side of the reactors 4a, 4b, 4c, and 4d are connected to each other. The connection point 12 and one end of the rectifier circuit 20 are connected by an electrical wire 16a. The converter circuit 10 further includes a connection point 14 at which cathodes of the backflow-preventing diodes 5a, 5b, 5c, and 5d are connected to each other. The connection point 14 is connected to a positive-side terminal of the smoothing capacitor 6.

In the unit converter 100a, the other end of the reactor 4a is connected to an anode of the backflow-preventing diode 5a. A connection point between the reactor 4a and the backflow-preventing diode 5a is connected to one end of the switching element 3a. The unit converters 100b, 100c, and 100d are configured similarly to the unit converter 100a. In the unit converters 100a, 100b, 100c, and 100d, the other ends of the switching elements 3a, 3b, 3c, and 3d are also connected to each other. The other ends of the switching elements 3a, 3b, 3c, and 3d are connected to the other end of the rectifier circuit 20 by an electrical wire 16b.

An example of the switching elements 3a, 3b, 3c, and 3d is a metal oxide semiconductor field effect transistor (MOSFET). Instead of the MOSFET, an insulated gate bipolar transistor (IGBT) may be used.

Each of the switching elements 3a, 3b, 3c, and 3d includes a diode connected in antiparallel between a drain and a source. The antiparallel connection means that a drain of the MOSFET and a cathode of the diode are connected, and a source of the MOSFET and an anode of the diode are connected. As the diode, a parasitic diode included in the MOSFET may be used. Parasitic diodes are also called body diodes.

The switching elements 3a, 3b, 3c, and 3d are not limited to MOSFETs formed of silicon, and may be MOSFETs formed of a wide band gap semiconductor such as silicon carbide, gallium nitride, gallium oxide, or diamond.

In general, wide band gap semiconductors have higher withstand voltage and heat resistance than silicon semiconductors. Therefore, by using a wide band gap semiconductor in each of the switching elements 3a, 3b, 3c, and 3d, the withstand voltage and the allowable current density of the switching elements increase, which makes it possible to reduce the size of a semiconductor module including the switching elements incorporated therein.

The current detector 73 is arranged on the electrical wire 16b. The current detector 73 detects a summed current Idc which is the sum of the reactor currents flowing through the reactors 4a, 4b, 4c, and 4d. FIG. 1 exemplifies the configuration in which the current detector 73 is arranged on the electrical wire 16b, but there is no limitation thereto. The current detector 73 may be arranged on the electrical wire 16a.

The voltage detector 71 detects an alternating-current voltage vac which is an output voltage of the alternating-current power supply 1. The voltage detector 72 detects a capacitor voltage Vdc which is a voltage of the smoothing capacitor 6. The capacitor voltage Vdc is also an output voltage of the converter circuit 10.

The control device 200 includes a processor 200a and a memory 200b. The control device 200 receives a detection value of the summed current Idc detected by the current detector 73. The control device 200 receives a detection value of the alternating-current voltage vac detected by the voltage detector 71. The control device 200 receives a detection value of the capacitor voltage Vdc detected by the voltage detector 72.

The control device 200 generates gate signals G3a, G3b, G3c, and G3d on the basis of the summed current Idc, the alternating-current voltage vac, and the capacitor voltage Vdc.

The unit converters 100a, 100b, 100c, and 100d each include a gate driving circuit (not illustrated). The gate driving circuit of the unit converter 100a generates a drive pulse using the gate signal G3a output from the control device 200, and applies the generated drive pulse to a gate of the switching element 3a to drive the switching element 3a.

The gate driving circuit of the unit converter 100b generates a drive pulse using the gate signal G3b output from the control device 200, and applies the generated drive pulse to a gate of the switching element 3b to drive the switching element 3b.

The gate driving circuit of the unit converter 100c generates a drive pulse using the gate signal G3c output from the control device 200, and applies the generated drive pulse to a gate of the switching element 3c to drive the switching element 3c.

The gate driving circuit of the unit converter 100d generates a drive pulse using the gate signal G3d output from the control device 200, and applies the generated drive pulse to a gate of the switching element 3d to drive the switching element 3d.

Details of an operation of the control device 200 will be described later. Among the detection values input to the control device 200, the detection value of the alternating-current voltage vac detected by the voltage detector 71 is used to improve distortion of a current flowing through the converter circuit 10. Therefore, control related to basic operations of the converter circuit 10 is implemented even if the voltage detector 71 is not provided.

In the control device 200, the processor 200a is arithmetic means such as an arithmetic device, a microprocessor, a microcomputer, a central processing unit (CPU), or a digital signal processor (DSP). The memory 200b is a nonvolatile or volatile semiconductor memory such as a random access memory (RAM), a read only memory (ROM), a flash memory, an erasable programmable ROM (EPROM), or an electrically EPROM (EEPROM) (registered trademark).

The memory 200b stores a program for executing the functions of the control device 200 described above and a function of the control device 200 described later. The processor 200a sends and receives necessary information via an interface including an analog-to-digital converter and a digital-to-analog converter (not illustrated), and the processor 200a executes the program stored in the memory 200b, thereby performing necessary control. A result of calculation by the processor 200a is stored in the memory 200b.

When any of the switching elements 3a, 3b, 3c, and 3d is controlled and performs a switching operation, power supplied from the alternating-current power supply 1 is accumulated in a reactor corresponding thereto. The control device 200 performs control to cause the switching elements 3a, 3b, 3c, and 3d to perform switching operations with a predetermined duty so that a voltage output from the converter circuit 10 becomes a desired voltage.

Figure 2:
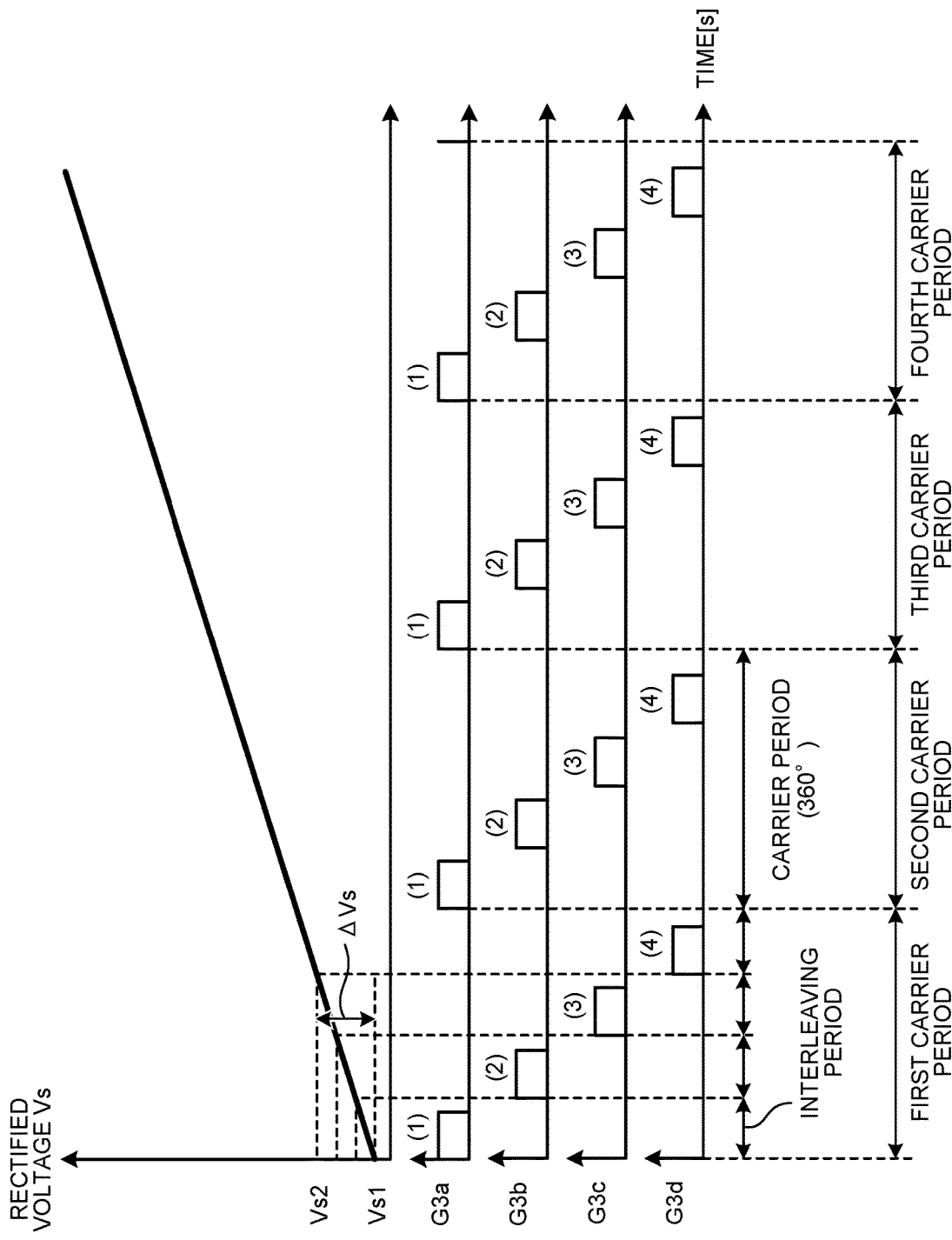
FIG. 2 is a diagram illustrating an example of a switching pattern used in a general power converting apparatus.

FIG. 2 is a diagram illustrating an example of a switching pattern used in a general power converting apparatus. In an upper portion of FIG. 2, a waveform of a rectified voltage Vs is illustrated. The rectified voltage Vs is an output voltage of the rectifier circuit 20, and is also a voltage applied to the unit converters 100a, 100b, 100c, and 100d. In a lower portion of FIG. 2, pulse trains of the gate signals G3a, G3b, G3c, and G3d are illustrated as a switching pattern related to a basic operation.

The gate signals G3a, G3b, G3c, and G3d are pulse-width modulation (PWM) signals. In the gate signals G3a, G3b, G3c, and G3d, an interval between adjacent gate signals is referred to as an "interleaving period".

A carrier period is a period of a carrier signal. The carrier signal will be described later. Hereinafter, the carrier period may be referred to as a "first period".

The interleaving period is a value obtained by dividing the carrier period by the number of phases. Assuming that a phase corresponding to one carrier period is 360°, the interleaving period in a power converting apparatus with the four-phase interleaved configuration is 90°(=360°/4).

In a case of the switching pattern illustrated in FIG. 2, switching control is performed for the switching element 3a, the switching element 3b, the switching element 3c, and the switching element 3d in this order every carrier period.

Next, changes in reactor currents that, when respective switching elements are turned on, flow through corresponding reactors in respective unit converters will be described. A change in the reactor current is referred to as a "current ripple", and the current ripples in the unit converters 100a, 100b, 100c, and 100d are denoted by ΔIa, ΔIb, ΔIc, and ΔId, respectively. These current ripples ΔIa, ΔIb, ΔIc, and ΔId can be expressed by the following formulas (1) to (4).

$$\Delta Ia = (Vs1/La) \cdot \text{Ton\_a} \quad (1)$$

$$\Delta Ib = \{(Vs1 + \Delta Vs \cdot (1/4))/Lb\} \cdot \text{Ton\_b} \quad (2)$$

$$\Delta Ic = \{(Vs1 + \Delta Vs \cdot (2/4))/Lc\} \cdot \text{Ton\_c} \quad (2)$$

$$\Delta Id = \{(Vs1 + \Delta Vs \cdot (3/4))/Ld\} \cdot \text{Ton\_d} \quad (2)$$

In the above formulas (1) to (4), La, Lb, Lc, and Ld are inductor values of the reactors 4a, 4b, 4c, and 4d, respectively. Ton_a, Ton_b, Ton_c, and Ton_d are ON times when the switching elements 3a, 3b, 3c, and 3d are turned on, respectively. Vs1 is a rectified voltage at the start of the first carrier period.

A period of the output voltage of the rectifier circuit 20 is half of a period of the alternating-current voltage, that is, ½ of the period of the alternating-current voltage. Hereinafter, the period of the alternating-current voltage may be referred to as a "second period".

Here, the carrier period is sufficiently shorter than half of the period of the alternating-current voltage. Therefore, it may be considered that the output voltage of the rectifier circuit 20 changes in a positive or negative proportional relationship within the carrier period. The amount of voltage change in the rectified voltage between the first carrier period and the second carrier period at that time is ΔVs. However, in the example of FIG. 2, for convenience of calculation, when the rectified voltage at the start of a fourth interleaving period of the first carrier period is denoted by Vs2, "Vs2−Vs1" is set as ΔVs.

In conventional switching control, the pulse widths of the gate signals G3a, G3b, G3c, and G3d are generally set to the same time, that is, Ton_a=Ton_b=Ton_c=Ton_d=Ton. In this case, the above formula (1) can be expressed as the following formula (5).

$$Vs1 = (La \cdot \Delta Ia)/\text{Ton} \quad (5)$$

In addition, the above formula (2) can be expressed as the following formula (6).

$$\Delta Ib = (Vs1/Lb + \Delta Vs/(4 \cdot Lb)) \cdot \text{Ton} \quad (6)$$

From the above formulas (5) and (6), a relationship between the current ripples ΔIa and ΔIb can be expressed by the following formula (7).

$$\Delta Ib = (La/Lb) \cdot \Delta Ia + \Delta Vs \cdot \text{Ton}/(4 \cdot Lb) \quad (7)$$

Furthermore, it is assumed that La=Lb=L holds regarding the inductor values of the reactors 4a and 4b. In this case, the above formula (7) can be expressed by the following formula (8).

$$\Delta Ib = \Delta Ia + \Delta Vs \cdot \text{Ton}/(4 \cdot L) \quad (8)$$

As indicated in the above formula (8), an imbalance of the component indicated in a second term occurs between the current ripple ΔIa and the current ripple ΔIb. Although calculation is omitted, the imbalance also occurs between the current ripples ΔIc and ΔId.

As described above, in the switching pattern illustrated in FIG. 2, even if the inductor values of the reactors 4a to 4d are the same, or even if the pulse widths of the gate signals G3a to G3d are the same, the imbalance occurs among the current ripples ΔIa to ΔId. This is because the amplitudes of the alternating-current voltages input to the unit converters 100a to 100d slightly change at respective operation timings.

In addition, a waveform of the alternating-current voltage is repeatedly input to each of the unit converters with the period of the alternating-current voltage, so that the imbalance in the current ripples appears as steady imbalance, which makes it difficult to level the reactor currents.

Figure 3:
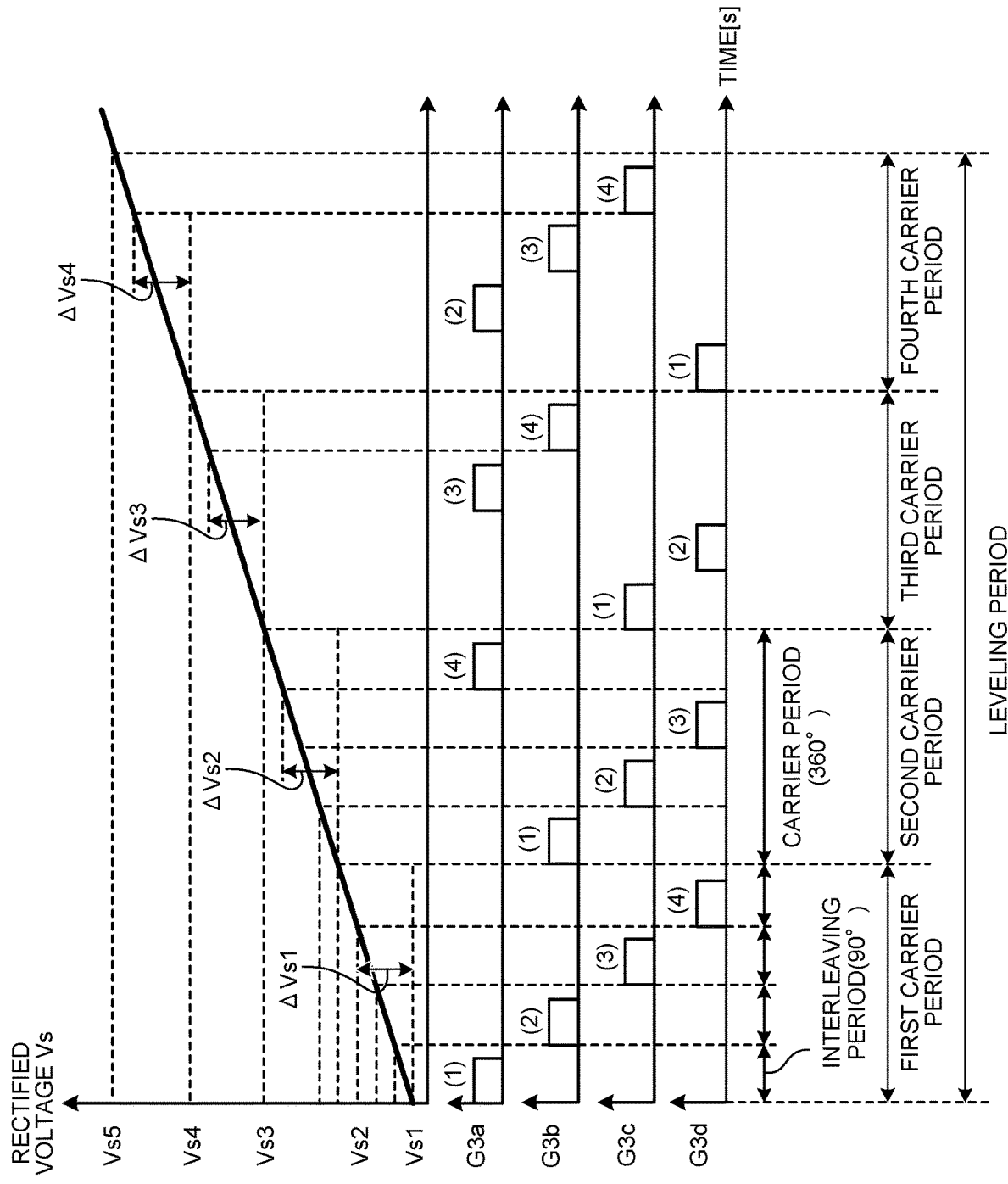
FIG. 3 is a diagram illustrating a first example of a switching pattern suitable for use in the power converting apparatus according to the first embodiment.

Therefore, in the power converting apparatus according to the first embodiment, the switching pattern is changed as illustrated in FIG. 3, for example. FIG. 3 is a diagram illustrating a first example of a switching pattern suitable for use in the power converting apparatus 120 according to the first embodiment.

A waveform of the rectified voltage Vs illustrated in an upper portion of FIG. 3 is the same as the waveform of the rectified voltage Vs illustrated in FIG. 2. In a lower portion of FIG. 3, pulse trains of the gate signals G3a, G3b, G3c, and G3d are illustrated as a switching pattern in a method according to the first embodiment.

In FIG. 3, Vs1 is a rectified voltage at the start of the first carrier period. Similarly, Vs2 is a rectified voltage at the start of the second carrier period, Vs3 is a rectified voltage at the start of a third carrier period, and Vs4 is a rectified voltage at the start of a fourth carrier period. In addition, Vs5 is a rectified voltage at the start of the next first carrier period.

Similarly to the case of FIG. 2, the output voltage of the rectifier circuit 20 can be considered to change in a positive or negative proportional relationship within the carrier period. The amounts of voltage change in the rectified voltage between adjacent carrier periods are denoted by $\Delta Vs1$, $\Delta Vs2$, and $\Delta Vs3$, for the purpose of indication thereof. That is, $\Delta Vs1$ is the amount of voltage change in the rectified voltage between the first carrier period and the second carrier period, and $\Delta Vs2$ is the amount of voltage change in the rectified voltage between the second carrier period and the third carrier period. In addition, $\Delta Vs3$ is the amount of voltage change in the rectified voltage between the third carrier period and the fourth carrier period, and $\Delta Vs4$ is the amount of voltage change in the rectified voltage between the fourth carrier period and the next first carrier period. However, in the example of FIG. 3, for convenience of calculation, a difference between Vs1 and the rectified voltage at the start of the fourth interleaving period of the first carrier period is set as $\Delta Vs1$. The same applies to $\Delta Vs2$, $\Delta Vs3$, and $\Delta Vs4$. Since the first to fourth interleaving periods are equal, a value obtained by multiplying "Vs2−Vs1" by (¾) may be set as $\Delta Vs1$. $\Delta Vs2$, $\Delta Vs3$, and $\Delta Vs4$ can also be similarly set.

In a case of the switching pattern illustrated in FIG. 3, first, in the first carrier period, switching control is performed for the switching element 3a, the switching element 3b, the switching element 3c, and the switching element 3d in this order. In the subsequent second carrier period, switching control is performed for the switching element 3b, the switching element 3c, the switching element 3d, and the switching element 3a in this order. Thereafter, in the third carrier period, the switching control is performed for the switching element 3c, the switching element 3d, the switching element 3a, and the switching element 3b in this order, and in the fourth carrier period, the switching control is performed for the switching element 3d, the switching element 3a, the switching element 3b, and the switching element 3c in this order.

Characteristics of the switching pattern illustrated in FIG. 3 are summarized as follows. First, a first gate signal, that is, a gate signal output first in switching control in a previous carrier period is a fourth gate signal, that is, a last gate signal in a current carrier period. In addition, gate signals output second, third, and fourth in the switching control in the previous carrier period are first, second, and third gate signals in the current carrier period, respectively. In other words, regarding the order of the switching control in the current carrier period, the order of the gate signal output first in the switching control in the previous carrier period is set as fourth, and the orders of the gate signals output second to fourth therein are sequentially advanced, and the gate signals are each advanced in phase by 90° and output.

When the fourth carrier period ends, the carrier period returns to the first carrier period. That is, the first to fourth carrier periods are repeated. The entirety of the first to fourth carrier periods is referred to as a "leveling period". Hereinafter, the leveling period may be referred to as a "third period".

Next, the current ripple in each unit converter when each unit converter is controlled with the switching pattern illustrated in FIG. 3 will be considered.

First, current ripples $\Delta Ia1$, $\Delta Ib1$, $\Delta Ic1$, and $\Delta Id1$ in the first carrier period can be expressed by the following formula (9).

$$\Delta Ia1 = Vs1/La \cdot Ton1$$

$$\Delta Ib1 = \{(Vs1 + \Delta Vs1 \cdot (1/4))/Lb\} \cdot Ton2$$

$$\Delta Ic1 = \{(Vs1 + \Delta Vs1 \cdot (2/4))/Lc\} \cdot Ton3$$

$$\Delta Id1 = \{(Vs1 + \Delta Vs1 \cdot (3/4))/Ld\} \cdot Ton4 \quad (9)$$

In addition, current ripples $\Delta Ia2$, $\Delta Ib2$, $\Delta Ic2$, and $\Delta Id2$ in the second carrier period can be expressed by the following formula (10).

$$\Delta Ia2 = \{(Vs2 + \Delta Vs2 \cdot (3/4))/La\} \cdot Ton1$$

$$\Delta Ib2 = Vs2/Lb \cdot Ton2$$

$$\Delta Ic2 = \{(Vs2 + \Delta Vs2 \cdot (1/4))/Lc\} \cdot Ton3$$

$$\Delta Id2 = \{(Vs2 + \Delta Vs2 \cdot (2/4))/Ld\} \cdot Ton4 \quad (10)$$

In addition, current ripples $\Delta Ia3$, $\Delta Ib3$, $\Delta Ic3$, and $\Delta Id3$ in the third carrier period can be expressed by the following formula (11).

$$\Delta Ia3 = \{(Vs3 + \Delta Vs3 \cdot (2/4))/La\} \cdot Ton1$$

$$\Delta Ib3 = \{(Vs3 + \Delta Vs3 \cdot (3/4))/Lb\} \cdot Ton2$$

$$\Delta Ic3 = Vs3/Lc \cdot Ton3$$

$$\Delta Id3 = \{(Vs3 + \Delta Vs3 \cdot (1/4))/Ld\} \cdot Ton4 \quad (11)$$

In addition, current ripples $\Delta Ia4$, $\Delta Ib4$, $\Delta Ic4$, and $\Delta Id4$ in the fourth carrier period can be expressed by the following formula (12).

$$\Delta Ia4 = \{(Vs4 + \Delta Vs4 \cdot (1/4))/La\} \cdot Ton1$$

$$\Delta Ib4 = \{(Vs4 + \Delta Vs4 \cdot (2/4))/Lb\} \cdot Ton2$$

$$\Delta Ic4 = \{(Vs4 + \Delta Vs4 \cdot (3/4))/Lc\} \cdot Ton3$$

$$\Delta Id4 = Vs4/Ld \cdot Ton4 \quad (12)$$

Here, when each carrier period is sufficiently short, Ton1, Ton2, Ton3, and Ton4, which are pulse widths of the gate signals G3a, G3b, G3c, and G3d in each carrier period, are substantially constant. Therefore, it may be considered that a relationship of Ton=Ton1=Ton2=Ton3=Ton4 holds in each carrier period. When each carrier period is sufficiently short with respect to the period of the alternating-current voltage, the amounts of voltage change in the rectified voltage, i.e., $\Delta Vs1$, $\Delta Vs2$, and $\Delta Vs3$, are substantially the same. Therefore, it may be considered that a relationship of $\Delta Vs = \Delta Vs1 = \Delta Vs2 = \Delta Vs3$ holds.

From the above formulas (9) to (12), sums $\Delta Ia'$, $\Delta Ib'$, $\Delta Ic'$, and $\Delta Id'$ of the current ripples in the respective phases from the first carrier period to the fourth carrier period can be expressed by the following formula (13).

$$\Delta Ia' = \{(Vs1 + Vs2 + Vs3 + Vs4 + \Delta Vs \cdot (3/2))/La\} \cdot Ton$$

$$\Delta Ib' = \{(Vs1 + Vs2 + Vs3 + Vs4 + \Delta Vs \cdot (3/2))/Lb\} \cdot Ton$$

$$\Delta Ic'=\{(Vs1+Vs2+Vs3+Vs4+\Delta Vs\cdot(3/2))/Lc\}\cdot Ton$$

$$\Delta Id'=\{(Vs1+Vs2+Vs3+Vs4+\Delta Vs\cdot(3/2))/Ld\}\cdot Ton \quad (13)$$

Here, in a case where La=Lb=Lc=Ld=L holds regarding the inductor values of the reactors 4a to 4d, from the above formula (13), ΔIa'=ΔIb'=ΔIc'=ΔId' holds regarding the sums of the current ripples. Therefore, the imbalance in the current ripples can be reduced.

As described above, with the use of the switching pattern of the first embodiment illustrated in FIG. 3, it is possible to reduce the imbalance in the current ripples in the leveling period obtained by multiplying the carrier period by the number of phases. As a result, the reactor currents can be leveled in the leveling period.

Figure 4:
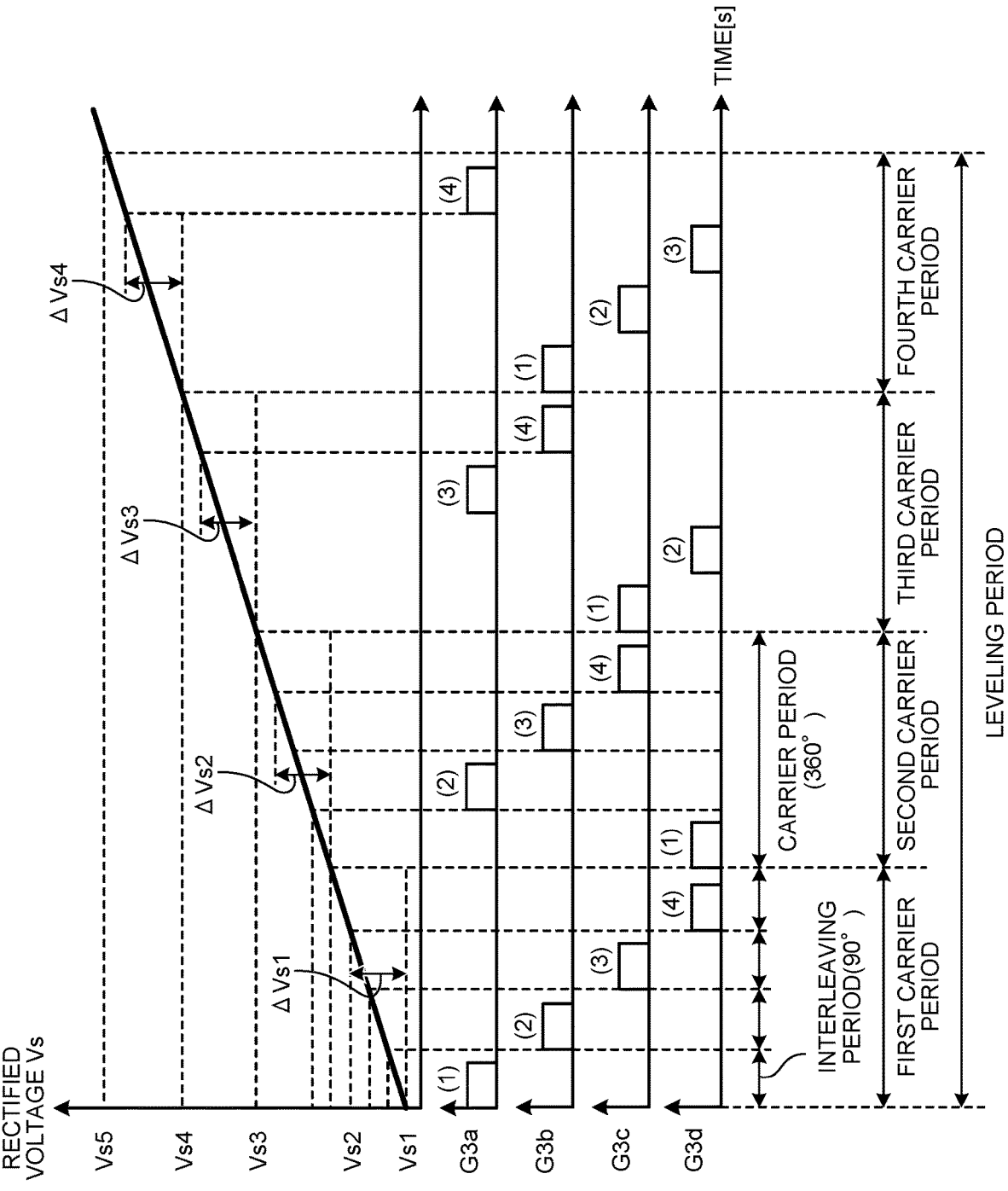
FIG. 4 is a diagram illustrating a second example of the switching pattern suitable for use in the power converting apparatus according to the first embodiment.

The switching pattern in FIG. 3 is an example, and there is no limitation thereto. For example, the converter circuit 10 may be operated by the switching pattern illustrated in FIG. 4. FIG. 4 is a diagram illustrating a second example of the switching pattern suitable for use in the power converting apparatus 120 according to the first embodiment. A waveform of the rectified voltage Vs illustrated in an upper portion of FIG. 4 is the same as the waveform of the rectified voltage Vs illustrated in FIG. 3.

In a case of the switching pattern illustrated in FIG. 4, first, in the first carrier period, switching control is performed for the switching element 3a, the switching element 3b, the switching element 3c, and the switching element 3d in this order. In the subsequent second carrier period, switching control is performed for the switching element 3d, the switching element 3a, the switching element 3b, and the switching element 3c in this order. Thereafter, in the third carrier period, the switching control is performed for the switching element 3c, the switching element 3d, the switching element 3a, and the switching element 3b in this order, and in the fourth carrier period, the switching control is performed for the switching element 3b, the switching element 3c, the switching element 3d, and the switching element 3a in this order.

Characteristics of the switching pattern illustrated in FIG. 4 are summarized as follows. First, a fourth gate signal, that is, a gate signal output last in switching control in a previous carrier period is a first gate signal, that is, an initial gate signal in a current carrier period. In addition, gate signals output first, second, and third in the switching control in the previous carrier period are second, third, and fourth gate signals in the current carrier period, respectively. In other words, regarding the order of the switching control in the current carrier period, the order of the gate signal output fourth in the switching control in the previous carrier period is set as first, and the orders of the gate signals output first to third therein are sequentially delayed, and the gate signals are each delayed in phase by 90° and output.

Although a detailed calculation formula is not presented, the imbalance in the current ripples can be reduced in the leveling period also by the switching pattern illustrated in FIG. 4. As a result, the reactor currents can be leveled in the leveling period.

Figure 5:
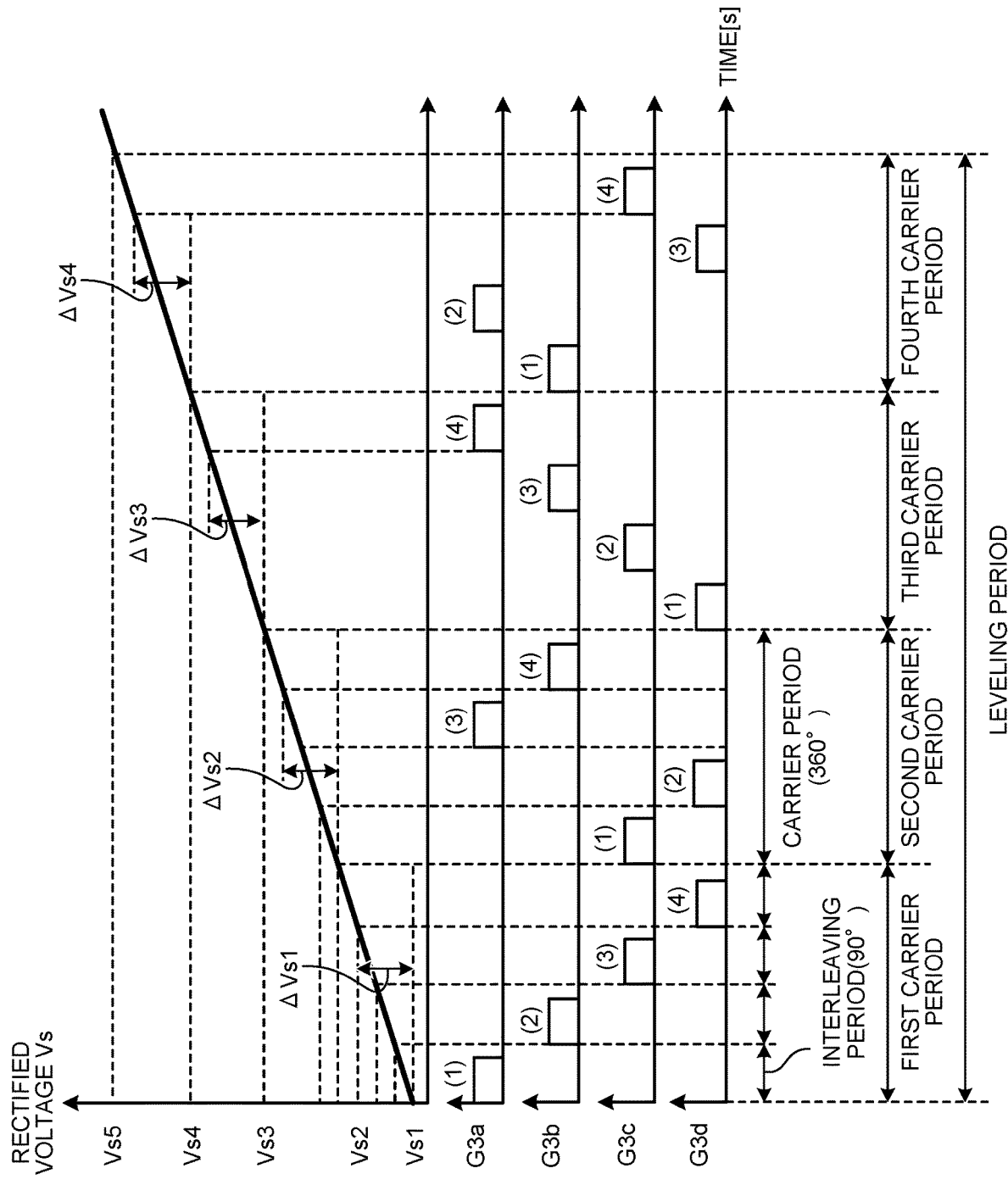
FIG. 5 is a diagram illustrating a third example of the switching pattern suitable for use in the power converting apparatus according to the first embodiment.

FIG. 5 is a diagram illustrating a third example of the switching pattern suitable for use in the power converting apparatus 120 according to the first embodiment. A waveform of the rectified voltage Vs illustrated in an upper portion of FIG. 5 is the same as the waveform of the rectified voltage Vs illustrated in FIG. 3.

In a case of the switching pattern illustrated in FIG. 5, first, in the first carrier period, switching control is performed for the switching element 3a, the switching element 3b, the switching element 3c, and the switching element 3d in this order. In the subsequent second carrier period, switching control is performed for the switching element 3c, the switching element 3d, the switching element 3a, and the switching element 3b in this order. Thereafter, in the third carrier period, the switching control is performed for the switching element 3d, the switching element 3c, the switching element 3b, and the switching element 3a in this order, and in the fourth carrier period, the switching control is performed for the switching element 3b, the switching element 3a, the switching element 3d, and the switching element 3c in this order.

Characteristics of the switching pattern illustrated in FIG. 5 are summarized as follows. First, the pulse-width modulation signal in each of the unit converters has one pulse within the carrier period and there are pulses for the number of phases within the leveling period obtained by multiplying the carrier period by the number of phases. Then, the pulses for the number of phases within the leveling period in each of the unit converters have phases all different from each other in the respective carrier periods.

Although a detailed calculation formula is not presented, the imbalance in the current ripples can be reduced in the leveling period also by the switching pattern illustrated in FIG. 5. As a result, the reactor currents can be leveled in the leveling period.

FIGS. 3 to 5 each exemplify a switching pattern in a case where the number of unit converters, that is, the number of phases of the unit converters is four, but there is no limitation thereto. Even in a case where the number of phases of the unit converters is two or more other than four, a switching pattern that can reduce the imbalance in the current ripples can be exemplified. An important point is as follows: it is only required that, in each of the unit converters, the pulses for the number of phases within the leveling period obtained by multiplying the carrier period by the number of phases have phases all different from each other in the respective carrier periods.

Figure 6:
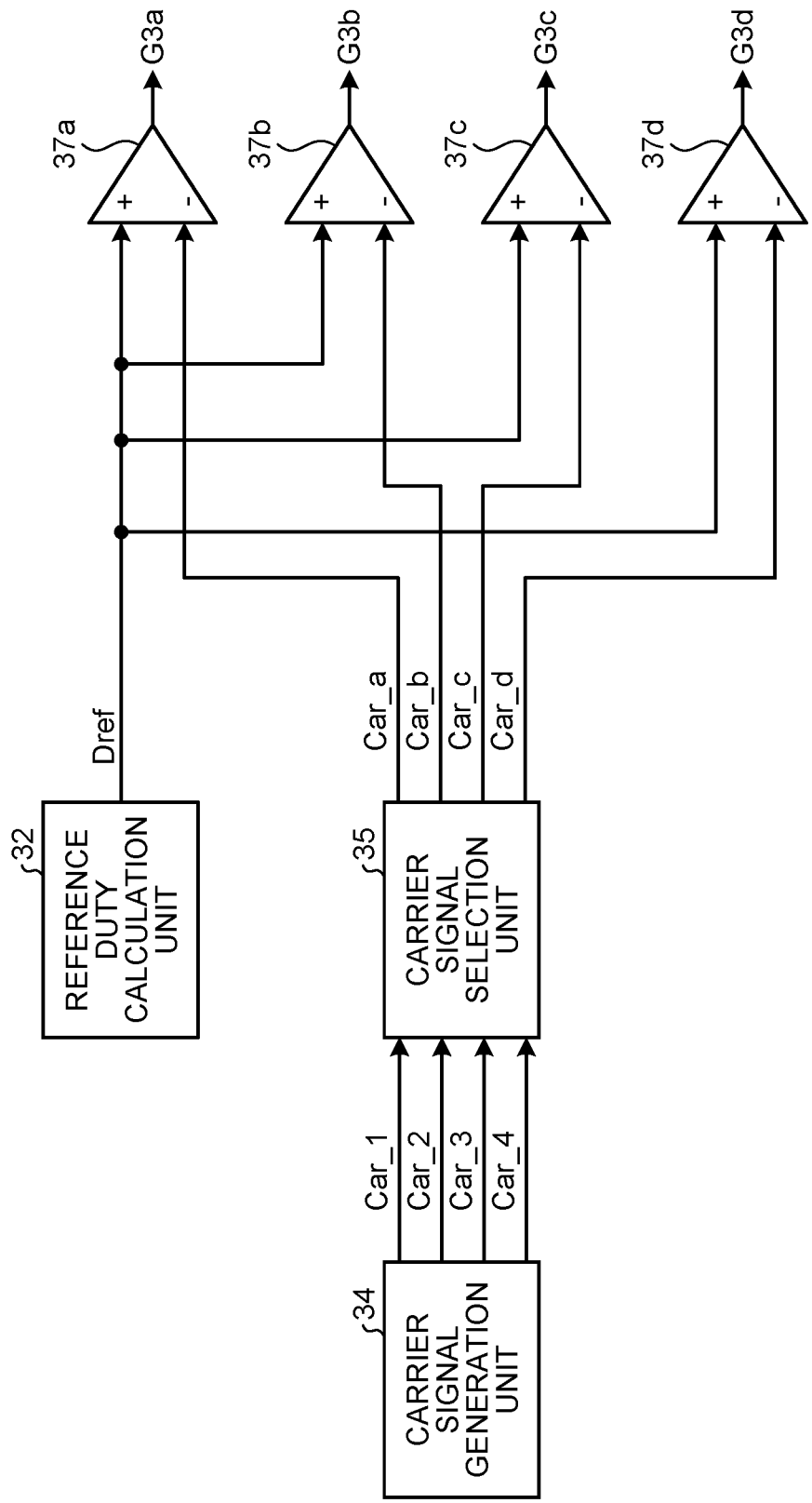
FIG. 6 is a block diagram illustrating an example configuration of a control system configured in a control device of the first embodiment.
Figure 7:
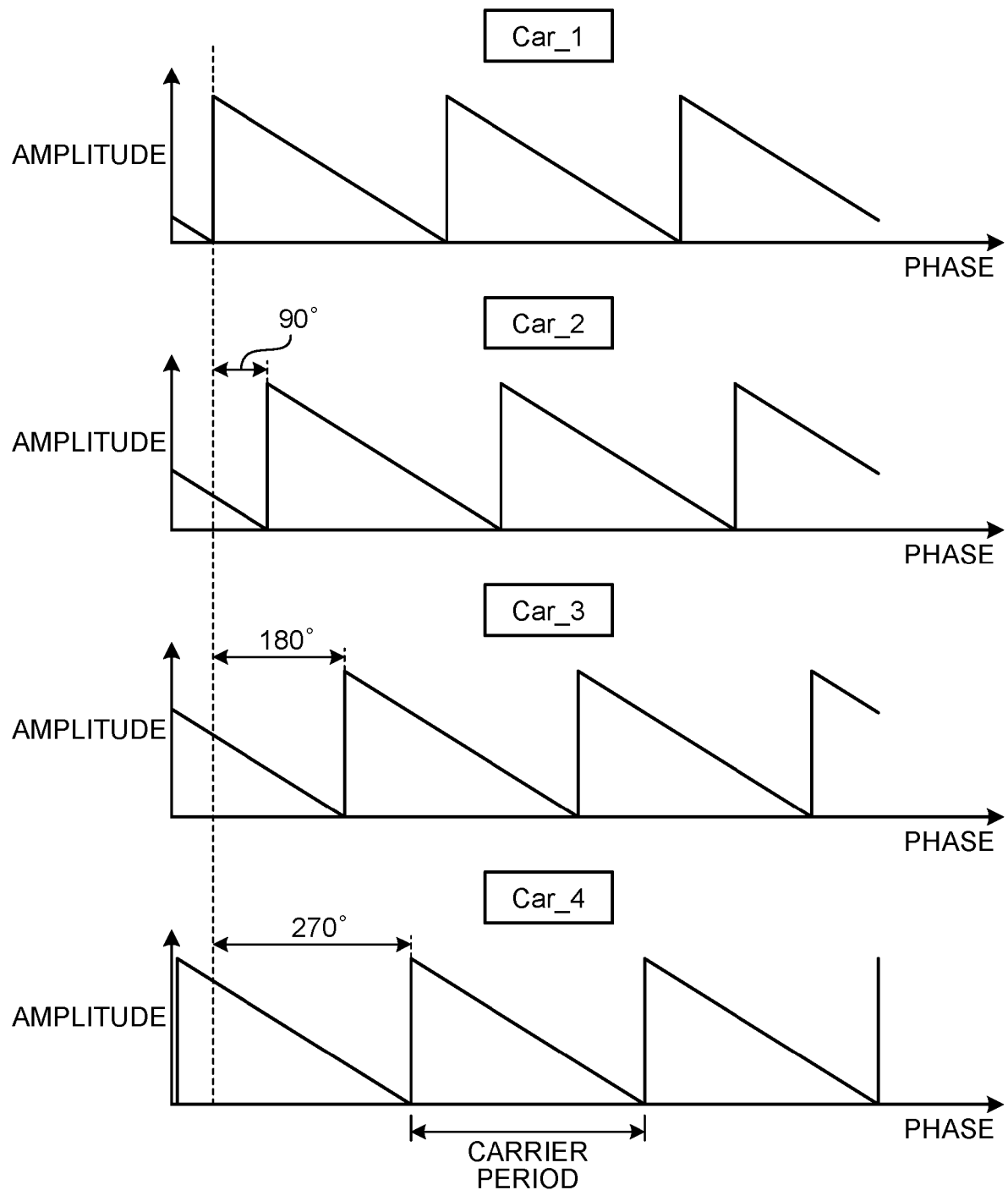
FIG. 7 is a diagram illustrating examples of waveforms of carrier signals used in the control system illustrated in FIG. 6.

Next, a control system for realizing the control method of the first embodiment described above will be described. FIG. 6 is a block diagram illustrating an example configuration of a control system 30 configured in the control device 200 of the first embodiment. FIG. 7 is a diagram illustrating examples of waveforms of carrier signals used in the control system 30 illustrated in FIG. 6.

As illustrated in FIG. 6, the control system 30 in the first embodiment includes a reference duty calculation unit 32, a carrier signal generation unit 34, a carrier signal selection unit 35, and comparators 37a, 37b, 37c, and 37d.

In FIG. 6, the reference duty calculation unit 32 calculates a reference duty Dref. The reference duty Dref is a reference signal used for generating the gate signals G3a, G3b, G3c, and G3d. The pulse widths of the gate signals G3a, G3b, G3c, and G3d and the phases of the gate signals G3a, G3b, G3c, and G3d in one carrier period are determined by the reference duty Dref. The reference duty Dref is input to each of positive terminals of the comparators 37a, 37b, 37c, and 37d.

The carrier signal generation unit 34 generates carrier signals Car_1, Car_2, Car_3, and Car_4. FIG. 7 illustrates examples of respective carrier signals in the case of the four-phase interleaved configuration. In the case of four phases, a phase difference between the carrier signals is 90°. Therefore, the carrier signal Car_2 has a phase difference of 90° with respect to the carrier signal Car_1. The carrier signal Car_3 has a phase difference of 180° with respect to the carrier signal Car_1. The carrier signal Car_4 has a phase difference of 270° with respect to the carrier signal Car_1.

The carrier signal selection unit 35 selects any one of the carrier signals Car_1, Car_2, Car_3, and Car_4 one by one, and allocates each of the carrier signals to one of the carrier signals Car_a, Car_b, Car_c, and Car_d. The carrier signal Car_a is input to a negative terminal of the comparator 37a as a signal used for generating the gate signal G3a. The carrier signal Car_b is input to a negative terminal of the comparator 37b as a signal used for generating the gate signal G3b. The carrier signal Car_c is input to a negative terminal of the comparator 37c as a signal used for generating the gate signal G3c. The carrier signal Car_d is input to a negative terminal of the comparator 37d as a signal used for generating the gate signal G3d.

Specifically, in the second carrier period in FIG. 3, the carrier signal Car_4 is selected as the carrier signal Car_a, and the carrier signal Car_1 is selected as the carrier signal Car_b. In addition, the carrier signal Car_2 is selected as the carrier signal Car_c, and the carrier signal Car_3 is selected as the carrier signal Car_d. In FIG. 7, a case where the carrier signals Car_1 to Car_4 exhibit reverse sawtooth waveforms is illustrated as an example, but there is no limitation thereto. The carrier signals Car_1 to Car_4 may exhibit triangular waveforms or sawtooth waveforms.

Returning to FIG. 6, the comparator 37a compares the reference duty Dref with an amplitude value of the carrier signal Car_a, and outputs a result of the comparison. As illustrated in FIG. 6, the output of the comparator 37a becomes the gate signal G3a to the switching element 3a. Similar processes are performed in the other comparators 37b, 37c, and 37d. The output of the comparator 37b becomes the gate signal G3b to the switching element 3b. The output of the comparator 37c becomes the gate signal G3c to the switching element 3c. The output of the comparator 37d becomes the gate signal G3d to the switching element 3d.

Figure 8:
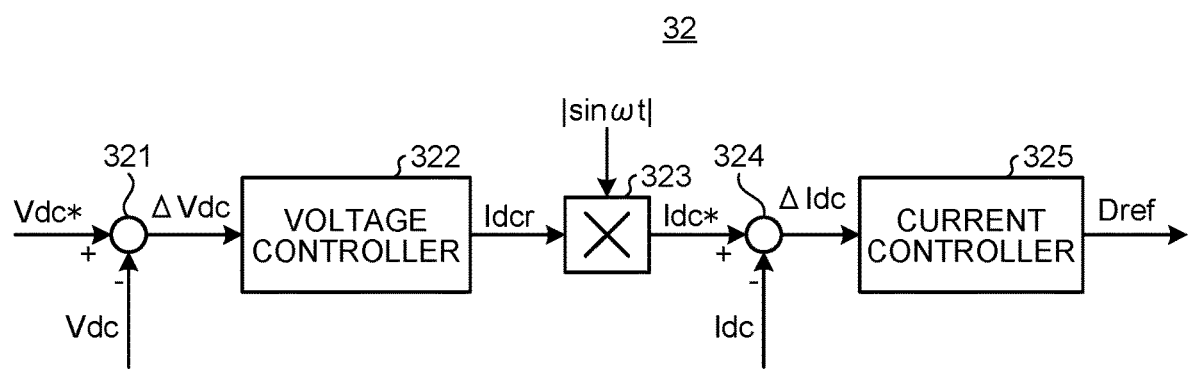
FIG. 8 is a diagram illustrating an example configuration of a reference duty calculation unit in the first embodiment.

Next, a configuration of the reference duty calculation unit 32 in the first embodiment will be described. FIG. 8 is a diagram illustrating an example configuration of the reference duty calculation unit 32 in the first embodiment.

As illustrated in FIG. 8, the reference duty calculation unit 32 includes differentiators 321 and 324, a voltage controller 322, a multiplier 323, and a current controller 325. Examples of the voltage controller 322 and the current controller 325 are proportional integral (PI) controllers. Hereinafter, a case where the voltage controller 322 and the current controller 325 are PI controllers will be described as an example.

The differentiator 321 calculates a deviation $\Delta Vdc$ between a predetermined command value Vdc* of the capacitor voltage Vdc and a detection value of the capacitor voltage Vdc. The voltage controller 322 performs PI control on the deviation $\Delta Vdc$ to thereby generate an amplitude command value Idcr of the summed current Idc.

In the multiplier 323, the amplitude command value Idcr of the summed current Idc is multiplied by an absolute value $|\sin \omega t|$ of a sine wave signal of an angular frequency $\omega (=2 \cdot f)$. Denoted by f is a frequency of the alternating-current voltage output from the alternating-current power supply 1, that is, a power supply frequency.

The absolute value $|\sin \omega|$ of the sine wave signal is a signal synchronized with the phase of the alternating-current voltage vac, and is generated on the basis of the detection value of the alternating-current voltage vac.

The differentiator 324 calculates a deviation $\Delta dc$ between a command value Idc* of the summed current Idc which is an output of the multiplier 323 and the summed current Idc. The current controller 325 performs PI control on the deviation $\Delta Idc$ to thereby generate the reference duty Dref.

As described above, the power converting apparatus according to the first embodiment includes the converter circuit converting an alternating-current voltage output from the alternating-current power supply into a direct-current voltage. The converter circuit includes the unit converters for the number of phases being more than one. The power converting apparatus generates a reference duty on the basis of detection values of the current detector and the voltage detector and generates, on the basis of a result of comparison between the reference duty and a carrier signal, a pulse-width modulation signal for controlling the switching element. The pulse-width modulation signals in the unit converters for the number of phases being more than one each have one pulse within the first period and have pulses for the number of phases within the third period, the third period being obtained by multiplying the first period by the number of phases. In addition, the pulses for the number of phases within the third period have phases all different from each other in the respective first periods. As a result, a voltage error due to the phases within the first period can be dispersed to the plurality of first periods. As a result, an effect that it is possible to level the reactor currents while preventing an increase in manufacturing cost is obtained.

Regarding pulses the number of which is smaller by one than the number of phases within the third period in each of the unit converters, a succeeding pulse may be advanced in phase within the first period relative to a preceding pulse. Alternatively, regarding pulses the number of which is smaller by one than the number of phases within the third period in each of the unit converters, the succeeding pulse may be delayed in phase within the first period relative to the preceding pulse. Since there is a regularity in a switching pattern having such pulses, an effect of facilitating generation of a pulse-width modulation signal is obtained.

In each of the unit converters, the carrier signals used within the third period are configured to have phases all different from each other in the respective first periods. With such a configuration, an effect of facilitating generation of a switching pattern for leveling the reactor currents is obtained.

Second Embodiment

Figure 9:
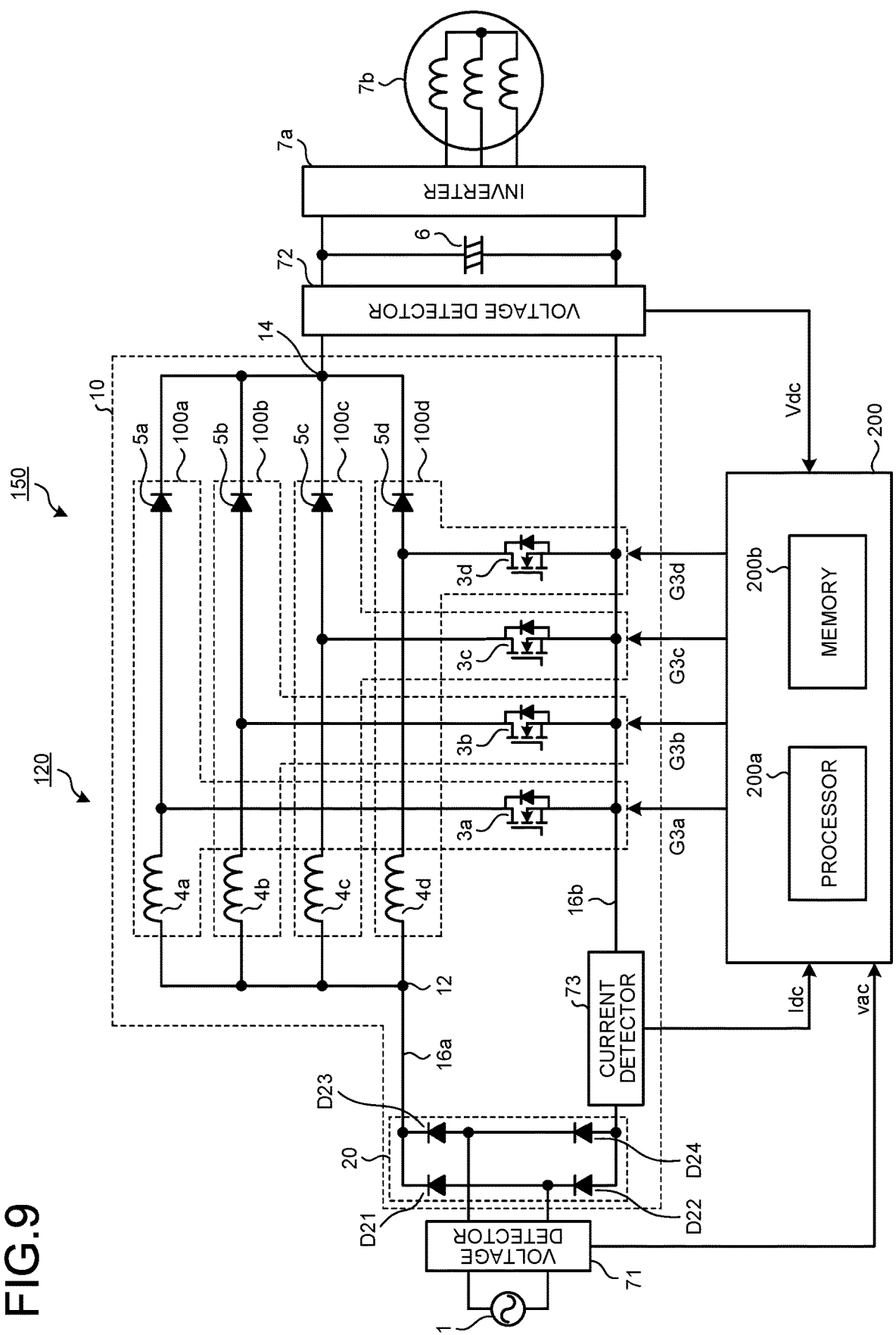
FIG. 9 is a diagram illustrating an example configuration of a motor driving apparatus according to a second embodiment.

In a second embodiment, an example will be described in which the power converting apparatus 120 described in the first embodiment is applied to a motor driving apparatus. FIG. 9 is a diagram illustrating an example configuration of a motor driving apparatus 150 according to the second embodiment. The motor driving apparatus 150 according to the second embodiment illustrated in FIG. 9 is obtained by adding an inverter 7a and a motor 7b to the configuration of the power converting apparatus 120 illustrated in FIG. 1.

The motor 7b is connected to an output side of the inverter 7a. The motor 7b is an example of a load device. The inverter 7a converts direct-current power accumulated in the smoothing capacitor 6 into alternating-current power, and supplies the alternating-current power obtained by conversion to the motor 7b to thereby drive the motor 7b. The motor driving apparatus 150 illustrated in FIG. 9 can be applied to products such as blowers, compressors, and air conditioners.

Figure 10:
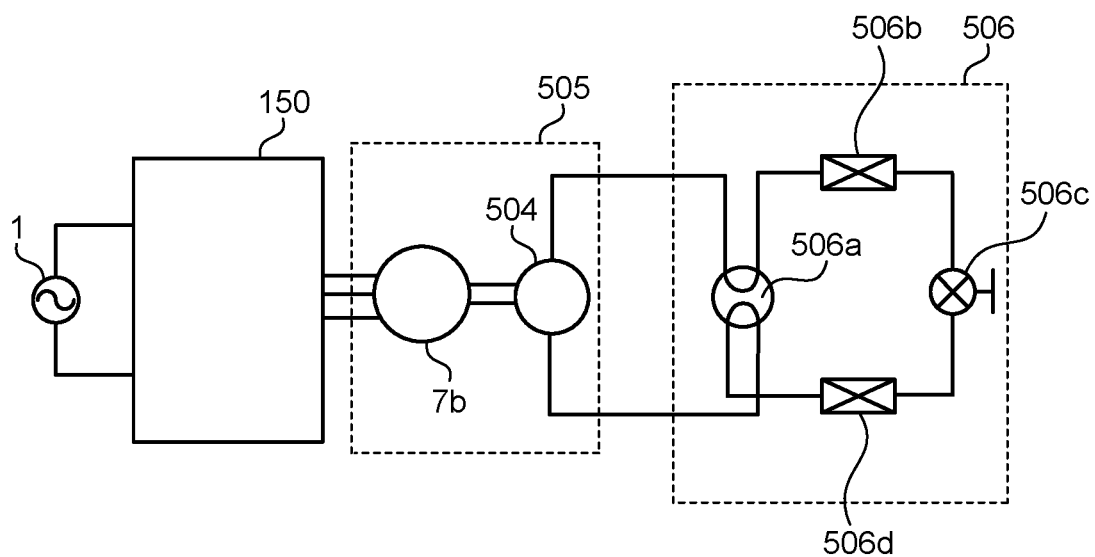
FIG. 10 is a diagram illustrating an example in which the motor driving apparatus illustrated in FIG. 9 is applied to an air conditioner.

FIG. 10 is a diagram illustrating an example in which the motor driving apparatus 150 illustrated in FIG. 9 is applied to an air conditioner. The motor 7b is connected to an output side of the motor driving apparatus 150, and the motor 7b is coupled to a compression element 504. A compressor 505 includes the motor 7b and the compression element 504. A refrigeration cycle unit 506 is configured to include a four-way valve 506a, an indoor heat exchanger 506b, an expansion valve 506c, and an outdoor heat exchanger 506d.

A flow path of a refrigerant circulating inside the air conditioner is configured as follows: the refrigerant flows out from the compression element 504, and returns to the compression element 504 via the four-way valve 506a, the indoor heat exchanger 506b, the expansion valve 506c, the outdoor heat exchanger 506d, and again via the four-way valve 506a. The motor driving apparatus 150 receives power supplied from the alternating-current power supply 1 and rotates the motor 7b. The rotation of the motor 7b makes it possible for the compression element 504 to execute a compression operation of the refrigerant, and to circulate the refrigerant inside the refrigeration cycle unit 506.

The motor driving apparatus 150 according to the second embodiment includes the power converting apparatus 120 according to the first embodiment. As a result, the effect described in the first embodiment can be achieved in products such as blowers, compressors, and air conditioners to which the motor driving apparatus 150 according to the second embodiment is applied.

The configurations described in the embodiments above are merely examples and can be combined with other known technology and part of the configurations can be omitted or modified without departing from the gist thereof.

The invention claimed is:

1. A power converting apparatus comprising:
   a converter circuit comprising unit converters for a number of phases and converting an alternating-current voltage output from an alternating-current power supply into a direct-current voltage, each of the unit converters comprising one reactor and at least one switching element, the number of phases being more than one;
   a current detector detecting a sum of currents flowing through the respective reactors;
   a voltage detector detecting an output voltage of the converter circuit; and
   a control device generating a reference duty on a basis of detection values of the current detector and the voltage detector and generating, on a basis of a result of comparison between the reference duty and a carrier signal, a pulse-width modulation signal for controlling the switching element, wherein
   a first period is shorter than a second period, the first period being a period of the carrier signal and the second period being a period of the alternating-current voltage, and
   in each of the unit converters,
   the pulse-width modulation signal has one pulse within the first period and has pulses for the number of phases within a third period, the third period being obtained by multiplying the first period by the number of phases, and
   the pulses for the number of phases within the third period have phases all different from each other in the respective first periods.

2. The power converting apparatus according to claim 1, wherein
   regarding pulses a number of which is smaller by one than the number of phases within the third period in each of the unit converters, a succeeding pulse is advanced in phase within the first period relative to a preceding pulse.

3. The power converting apparatus according to claim 1, wherein
   regarding pulses a number of which is smaller by one than the number of phases within the third period in each of the unit converters, a succeeding pulse is delayed in phase within the first period relative to a preceding pulse.

4. The power converting apparatus according to claim 1, wherein
   in each of the unit converters, the carrier signal used within the third period has phases all different from each other in the respective first periods.

5. The power converting apparatus according to claim 1, wherein
   a plurality of the switching elements are formed of a wide bandgap semiconductor.

6. The power converting apparatus according to claim 5, wherein
   the wide bandgap semiconductor is silicon carbide, gallium nitride, gallium oxide, or diamond.

7. A motor driving apparatus comprising:
   the power converting apparatus according to claim 1; and
   an inverter converting direct-current power output from the power converting apparatus into alternating-current power.

8. A blower comprising:
   the motor driving apparatus according to claim 7.

9. A compressor comprising:
   the motor driving apparatus according to claim 7.

10. An air conditioner comprising:
    a blower and a compressor comprising the motor driving apparatus according to claim 7.

* * * * *